(12) United States Patent
Eling et al.

(10) Patent No.: US 12,054,576 B2
(45) Date of Patent: Aug. 6, 2024

(54) ADHESIVES BASED ON CARBODIMIDE CHEMISTRY

(71) Applicant: BASF SE, Ludwigshafen am Rhein (DE)

(72) Inventors: Berend Eling, Ludwigshafen (DE); Stefan Auffarth, Ludwigshafen (DE); Martin Linnenbrink, Ludwigshafen (DE); Julio Albuerne, Ludwigshafen (DE); Linyu Mu, Hamburg (DE)

(73) Assignee: BASF SE, Ludwigshafen am Rhein (DE)

( * ) Notice: Subject to any disclaimer, the term of this patent is extended or adjusted under 35 U.S.C. 154(b) by 332 days.

(21) Appl. No.: 17/435,758

(22) PCT Filed: Mar. 5, 2020

(86) PCT No.: PCT/EP2020/055823
§ 371 (c)(1),
(2) Date: Sep. 2, 2021

(87) PCT Pub. No.: WO2020/178380
PCT Pub. Date: Sep. 10, 2020

(65) Prior Publication Data
US 2022/0153906 A1 May 19, 2022

(30) Foreign Application Priority Data

Mar. 7, 2019 (EP) ..................... 19161285

(51) Int. Cl.
| | | |
|---|---|---|
| C08G 18/02 | (2006.01) | |
| B32B 27/40 | (2006.01) | |
| C08G 18/09 | (2006.01) | |
| C08G 18/12 | (2006.01) | |
| C08G 18/16 | (2006.01) | |
| C08G 18/22 | (2006.01) | |
| C08G 18/24 | (2006.01) | |
| C08G 18/28 | (2006.01) | |
| C08G 18/42 | (2006.01) | |
| C08G 18/71 | (2006.01) | |
| C08G 18/72 | (2006.01) | |
| C08G 18/76 | (2006.01) | |
| C08G 18/79 | (2006.01) | |
| C08L 67/00 | (2006.01) | |

(Continued)

(52) U.S. Cl.
CPC ............ *C08G 18/025* (2013.01); *B32B 27/40* (2013.01); *C08G 18/095* (2013.01); *C08G 18/12* (2013.01); *C08G 18/168* (2013.01); *C08G 18/22* (2013.01); *C08G 18/227* (2013.01); *C08G 18/246* (2013.01); *C08G 18/2815* (2013.01); *C08G 18/282* (2013.01); *C08G 18/2825* (2013.01); *C08G 18/4202* (2013.01); *C08G 18/4238* (2013.01); *C08G 18/71* (2013.01); *C08G 18/72* (2013.01); *C08G 18/7621* (2013.01); *C08G 18/797* (2013.01); *C08L 67/00* (2013.01); *C09J 167/02* (2013.01); *C09J 175/06* (2013.01); *C09J 179/00* (2013.01); *C08G 2115/06* (2021.01); *C08G 2170/20* (2013.01); *C08G 2250/00* (2013.01); *C09J 2301/304* (2020.08)

(58) Field of Classification Search
CPC .... C08G 18/025; C08G 18/095; C08G 18/12; C08G 18/168; C08G 18/246; C08G 18/282; C08G 18/4202; C08G 18/4238; C08G 18/71; C08G 18/7621; C08G 18/797; C08G 2115/06; C08G 2170/20; C08G 2250/00; C08G 18/22; C08G 18/227; C08G 18/2825; C08G 18/2815; C08G 18/72; C09J 175/06; C09J 2301/304; C09J 167/02; C09J 179/00; B32B 27/40; C08L 67/00
See application file for complete search history.

(56) References Cited

U.S. PATENT DOCUMENTS

| | | |
|---|---|---|
| 5,079,326 A | 1/1992 | Suzuki et al. |
| 8,507,791 B2 | 8/2013 | Suzuta et al. |

(Continued)

FOREIGN PATENT DOCUMENTS

| | | |
|---|---|---|
| EP | 0381324 A1 | 8/1990 |
| EP | 3107946 A1 | 12/2016 |

(Continued)

OTHER PUBLICATIONS

W. Adam and F. Yany, "Analytical Chemistry", vol. 49, No. 4, Apr. 1977, p. 676.

(Continued)

*Primary Examiner* — Rabon A Sergent
(74) *Attorney, Agent, or Firm* — Armstrong Teasdale LLP

(57) ABSTRACT

Described herein is a thermosetting resin composition, obtained from the reaction of at least: a polycarbodiimide (i), where the number of carbodiimide groups per molecule is in the range of from 1 to 10; a mixture of crystalline and amorphous polyols (ii), where the molar ratio of carbodiimide groups in the polycarbodiimide according to (i) to hydroxyl groups in the mixture according to (ii) is in the range of from 1:2 to 2:1 and where at least 25 weight-% of the mixture according to (ii) consists of at least one crystalline polyesterol, based on the overall weight of the mixture being 100 weight-%. Also described herein is a method of using the thermosetting resin composition as an adhesive, as well as processes for preparation of adhesives, an element including an adhesive layer on at least one substrate, and an adhesive film, obtained from one of the processes.

20 Claims, No Drawings

(51) Int. Cl.
      *C09J 167/02*    (2006.01)
      *C09J 175/06*    (2006.01)
      *C09J 179/00*    (2006.01)

(56) References Cited

U.S. PATENT DOCUMENTS

| | | |
|---|---|---|
| 9,321,879 B2 | 4/2016 | Laufer et al. |
| 11,066,508 B2 | 7/2021 | Eling et al. |

FOREIGN PATENT DOCUMENTS

| | | | |
|---|---|---|---|
| JP | 2005-531681 A | * | 10/2005 |
| WO | 2015123416 A1 | | 8/2015 |
| WO | 2015127038 A1 | | 8/2015 |
| WO | 2015127041 A1 | | 8/2015 |
| WO | 2016026807 A1 | | 2/2016 |

OTHER PUBLICATIONS

International Search Report and Written Opinion for corresponding PCT/EP2020/055823 mailed May 4, 2020, 8 Pages.

* cited by examiner

ADHESIVES BASED ON CARBODIMIDE CHEMISTRY

CROSS-REFERENCE TO RELATED APPLICATIONS

This application is a U.S. National Phase Application of International Patent Application No. PCT/EP2020/055823, filed Mar. 5, 2020, which claims priority to European Patent Application No. 19161285.2 filed Mar. 7, 2019, the entire contents of which are hereby incorporated by reference herein.

The present invention relates to a thermosetting resin composition, in particular for the use as adhesive, obtained or obtainable from the reaction of at least: a polycarbodiimide (i), wherein the number of carbodiimide groups per molecule is in the range of from 1 to 10; a mixture of crystalline and amorphous polyols (ii), wherein the molar ratio of carbodiimide groups in the polycarbodiimide according to (i) to hydroxyl groups in the polyesterol according to (ii) is in the range of from 1:2 to 2:1, and wherein at least 25 weight-% of the mixture according to (ii) consists of at least one crystalline polyesterol, based on the overall weight of the mixture being 100 weight-%. The invention further relates to the use of said thermosetting resin composition as adhesive, as well as to processes for the preparation of adhesives, an element comprising an adhesive layer on at least one substrate and to an adhesive film, obtained or obtainable from one of the processes.

Polyurethane- and isocyanate-based adhesives are known but are in some cases associated with environmental, health or safety problems. Even if polyurethane is not a single material with a fixed composition but rather comprises a range of chemicals sharing similar chemistry, it is a polymer composed of units of organic chains joined by urethane (—NH—C(=O)—O—) or carbamate (—NR—C(=O)—O—) links. That is, polyurethane polymers are formed by the reaction of isocyanate(s) and polyol(s). Both the isocyanates and polyols used usually contain two or more functional groups per molecule.

Isocyanate free polymers are known: for example, U.S. Pat. No. 5,079,326 A discloses a thermosetting resin comprising the reaction product of a polycarbodiimide with at least one crosslinking agent having two or more active hydrogen groups in its molecules, for example, 2,4,6-triamino-1,3,5striazine or 2,4-diamino-6-phenyl-1,3,5-striazine. The thermosetting resin is described as having high thermal resistance, high strength, flame resistance, and good processability. The reaction of carbodiimide (CDI) with alcohols results in the formation of polymers with iso-urea links (—NH—C(=N—R)—O—). The chemistry to prepare CDI containing molecules is extensively documented in 'Chemistry and technology of carbodiimides', Henri Ulrich, Wiley, Hoboken, USA, 2007. CDI containing molecules can also be prepared from isocyanates. Oligomeric CDI structures can be obtained when reacting a two-functional isocyanate partially with a mono-functional alcohol and then adding a phospholene based catalyst (WO2015/123416 A1). The resulting polycarbodiimide (pCDI) polymer may be utilized in, for example, electrical and electronic packaging applications or in synthetic fiber applications, in coating compositions and/or inks. Oligomeric CDI structures can also be obtained starting from a two-functional isocyanate in combination with a monofunctional isocyanate and using a phospholene based catalyst, which results in capped polycarbodiimides (WO2015/127041 A1). WO2015/127041 A1 also discloses compositions comprising these capped polycarbodiimide and polyols. A process of preparing a capped polycarbodiimide and polymers comprising the reaction product of a capped polycarbodiimide and a monomeric acid are disclosed in WO 2015/127038 A1.

All documents have in common that first, extensive lists are disclosed for the components used and also broad ranges of suitable mixing ratios of (capped) pCDI and reactive compounds are described for the preparation of the final resins. Second, all documents are silent with respect to use of the resins as adhesives.

The problem underlying the present invention was the provision of further isocyanate free polymers, which are usable as adhesives and which have improved adhesive properties.

According to the present invention, this object was solved by a thermosetting resin composition, in particular for the use as adhesive, obtained or obtainable from the reaction of at least:
  i) a polycarbodiimide (pCDI), wherein the number of carbodiimide groups per molecule is in the range of from 1 to 10;
  ii) a polyesterol,
wherein the molar ratio of carbodiimide groups in the polycarbodiimide according to (i) to hydroxyl groups in the polyesterol according to (ii) is in the range of from 1:2 to 2:1.

According to a preferred embodiment, the polyesterol according to (ii) is crystalline. Preferably, the crystalline polyesterol (ii) is used in the form of a mixture of crystalline and amorphous polyols, wherein at least 25 weight-% of the mixture according to (ii) consists of at least one crystalline polyesterol, based on the overall weight of the mixture being 100 weight-%. Thus, according to a preferred embodiment, the thermosetting resin composition is obtained or obtainable from the reaction of at least:
  i) a polycarbodiimide, wherein the number of carbodiimide groups per molecule is in the range of from 1 to 10;
  ii) a mixture of crystalline and amorphous polyols,
wherein the molar ratio of carbodiimide groups in the polycarbodiimide according to (i) to hydroxyl groups in the mixture according to (ii) is in the range of from 1:2 to 2:1, and wherein at least 25 weight-% of the mixture according to (ii) consists of at least one crystalline polyesterol, based on the overall weight of the mixture being 100 weight-%.

Surprisingly, it could be shown that the use of the specific combination of pCDI with, especially crystalline, polyesterol resulted in superior properties, for example the resulting adhesives had a Shear Adhesion Failure Temperature (SAFT) of more than 80° C. SAFT represents the temperature at which the adhesive bond fails, i.e. is an indicator for not only the adhesive strength at room temperature but also the stability of the adhesive bond at higher temperatures. Further, the specific molar ratio of carbodiimide groups in pCDI to hydroxyl groups in the crystalline polyesterol in the range of from 1:2 to 2:1 clearly improved the mechanical properties of the thermosetting resin, which is apparent, for example, from the development of the shear force over time.

In one embodiment of the thermosetting resin composition, the polycarbodiimide according to (i) is obtained or obtainable from the reaction of at least:
  i.1) a polyisocyanate composition comprising at least one diisocyanate;
  i.2) a monofunctional compound selected from the group consisting of a monoisocyanate, an isocyanate reactive monofunctional compound, wherein the isocyanate reactive monofunctional compound is selected from the group consisting of a monoalcohol, a monothiol, a monoamine, and mixtures of two or more of these isocyanate reactive monofunctional compounds, and a mixture of monoisocyanate and isocyanate reactive monofunctional compound, preferably at least a monoalcohol;

in the presence of a carbodiimidization catalyst (i.3).

In one embodiment of the thermosetting resin composition, the polycarbodiimide according to (i) is obtained or obtainable by a) mixing the polyisocyanate composition according to (i.1) with at least a part of the monofunctional compound according to (i.2) at a temperature $T_1$ thereby obtaining a first mixture;

b) adding the catalyst (i.3) to the first mixture obtained in (a) at a temperature $T_2$ wherein $T_2$ is >$T_1$, thereby obtaining a precursor compound;

c) adjusting the precursor compound obtained in (b) to a temperature $T_3$;

d) adding the remaining part of the monofunctional compound according to (i.2) at temperature $T_3$; thereby obtaining the polycarbodiimide according to (i);

wherein:

$T_1$ is a temperature below 70° C., preferably a temperature in the range of from 5 to <70° C., more preferred in the range of from 5 to 69° C.;

$T_2$ is a temperature 70° C., preferably a temperature in the range of from 70 to 150° C., more preferred in the range of from 70 to 150° C.; and $T_3$ is a temperature below 100° C., preferably a temperature in the range of from 5 to 100° C., more preferred in the range of from 5 to 99° C.

In one embodiment of the thermosetting resin composition, the polyesterol according to (ii) has a melting temperature >30° C., preferably in the range of from >30 to 80° C., more preferably in the range of from 31 to 80° C. In a preferred embodiment, the at least one crystalline polyesterol of the mixture according to (ii) has a melting temperature >30° C., preferably in the range of from >30 to 80° C., more preferably in the range of from 31 to 80° C.

In one embodiment of the thermosetting resin composition, the polyesterol according to (ii) has a molecular weight in the range of from 500 to 5000 g/mol. Preferably, the at least one crystalline polyesterol of the mixture according to (ii) has a molecular weight in the range of from 500 to 5000 g/mol.

The crystalline polyesterols of the invention are known to the persons skilled in the art as crystalline polyesterols, but their crystallinity is difficult to determine. First, because the preferred molecular weight of the polyesterols is in the range of from 500 to 5000 g/mol, preferably in the range of from 750 to 3000 g/mol, and the hydroxyl chain ends limit the crystallization of the polyol. Second, because the temperature history the sample has experienced before the measurement is taken can influence the extend of crystallization. Third, the rate at which the determination of the crystallinity is carried out may influence the outcome of the measurement. The person skilled in the art recognizes the crystalline polyesterol by visual inspection of the polyesterols and its rheological behavior based on the following characteristics at room temperature (temperature in the range of from 20 to 25° C.):

A) the crystalline polyesterols have a white—turbid appearance as the crystals in the polyesterols have dimensions larger than the wave length of visible light and therefore act as scattering bodies.

B) The polyesterol does not flow under its own weight.

C) The polyesterol has a waxy consistency.

The polyesterol according to (ii) is considered as crystalline as long as at least one of (A), (B), (C), preferably two of (A), (B), (C), more preferably all three characteristics (A), (B) and (C) are fulfilled.

According to one embodiment, only one or more crystalline polyesterol(s) (ii) is/are used. Sometimes it is advantageous to reduce the crystallinity of the polyol phase by employing a mixture of polyols wherein a first polyol is the at least one crystalline polyesterol (ii) and one or more second polyol is amorphous. Thus, an embodiment of the present invention is that also mixtures (blends) of crystalline and amorphous polyols can be used, wherein at least 25 weight-%, preferably at least 50 weight-%, more preferred at least 75 weight-% of the mixture consists of one or more crystalline polyesterol, based on the overall weight of the mixture being 100 weight-%. The remaining portion up to 100 weight-% is/are one or more amorphous polyol(s). Preferably, at least 50 weight-%, more preferred at least 75 weight-% of the mixture of crystalline and amorphous polyols consists of at least one crystalline polyesterol, based on the overall weight of the mixture being 100 weight-%, wherein more preferably (ii) consists of one or more crystalline polyesterols. The term "amorphous polyol" comprises non-crystalline polyesterols (polyester polyols) and polyetherols (polyether polyols). Such polyols are described in WO 2016/026807 A1, wherein suitable polyetherols and their synthesis are disclosed on page 7, line 23 to page 8, line 14; suitable polyesterols and their synthesis are disclosed on page 8, line 16 to page 9, line 13. Polyesterols that are prepared from a single diol and a single diacid can be crystalline whereby the melting point of said polyesterols is determined by the number of carbon atoms in between the hetero atom groups. The higher the number of carbon atoms the higher the melting point. Polyesterols prepared from branched diols and/or branched diacids and from a mixtures of two or more diols and/or a mixture of two or more diacids are likely to be amorphous. When the polyesterol is at least partially crystalline its melting temperature is between 25 and 100° C., preferably between >30 and 80° C. more preferably between 31 and 80° C., dependent on structure of the diols and diacids as mentioned.

In one embodiment of the thermosetting resin composition, the polyesterol according to (ii) is a saturated polyesterol based on at least:

(ii.1) a compound having at least two hydroxyl groups reactive towards ester formation;

(ii.2) a compound having at least two carboxyl groups reactive towards ester formation; wherein:

the compound (ii.1) having at least two hydroxyl groups reactive towards ester formation is preferably a saturated diol; more preferably a saturated C2 to C18 alkyl diol; more preferably a saturated C2 to C10 alkyl diol selected from the group consisting of 1,2-ethane diol, diethylene glycol, 1,2-propane diol, dipropylene glycol, 1,4-butane diol, 1,5-pentane diol, 1,6-hexane diol, neopentylglycol, and mixtures of two or more of these diols; and the compound (ii.2) having at least two carboxyl groups reactive towards ester formation is preferably selected from the group consisting of saturated dicarboxylic acid, anhydride of a saturated dicarboxylic acid, ester of a saturated dicarboxylic acid, and mixtures of two or more of these components, more preferably selected from the group consisting of saturated C2 to C10 dicarboxylic acid and mixtures of two or more thereof, more preferred a saturated C2 to C10 dicarboxylic acid selected from the group consisting of succinic acid, glutaric acid, adipic acid, pimelic acid, suberic acid, azelaic acid, sebacic acid, 1,12-dodecanedioic acid, maleic acid, fumaric acid, hexahydrophthalic acid, hexahydroisophthalic acid, hexahydroterephthalic acid, 3,6,9-trioxaundecanedioic acid and mixtures of two or more of these dicarboxylic acids. Preferably, the at least one crystalline polyesterol of the mixture according to (ii) is a saturated polyesterol based on at least:
(ii.1) a compound having at least two hydroxyl groups reactive towards ester formation;
(ii.2) a compound having at least two carboxyl groups reactive towards ester formation; wherein:
the compound (ii.1) having at least two hydroxyl groups reactive towards ester formation is preferably a saturated diol; more preferably a saturated C2 to C18 alkyl diol; more preferably a saturated C2 to C10 alkyl diol selected from the group consisting of 1,2-ethane diol, diethylene glycol, 1,2-propane diol, dipropylene glycol, 1,4-butane diol, 1,5-pentane diol, 1,6-hexane diol, neopentylglycol, and mixtures of two or more of these diols; and
the compound (ii.2) having at least two carboxyl groups reactive towards ester formation is preferably selected from the group consisting of saturated dicarboxylic acid, anhydride of a saturated dicarboxylic acid, ester of a saturated dicarboxylic acid, and mixtures of two or more of these components, more preferably selected from the group consisting of of saturated C2 to C10 dicarboxylic acid and mixtures of two or more thereof, more preferred a saturated C2 to C10 dicarboxylic acid selected from the group consisting of succinic acid, glutaric acid, adipic acid, pimelic acid, suberic acid, azelaic acid, sebacic acid, 1,12-dodecanedioic acid, maleic acid, fumaric acid, hexahydrophthalic acid, hexahydroisophthalic acid, hexahydroterephthalic acid, 3,6,9-trioxaundecanedioic acid and mixtures of two or more of these dicarboxylic acids.

According to a preferred embodiment of the thermosetting resin composition, the polyesterol according to (ii) is a polyesterol based on a C2 to C10 dicarboxylic acid selected from the group consisting of adipic acid, azelaic acid sebacic acid, 12-dodecanedioic acid and mixtures of two or more of these dicarboxylic acids and a diol which is hexane-1,6-diol, neopentylglycol or a mixture of hexane-1,6-diol and neopentylglycol.

In another embodiment of the thermosetting resin composition, the polyesterol according to (ii) is a saturated polyesterol based on at least an alpha-omega-hydroxy-carboxylic acid, a cyclic oligomer of an alpha-omega-hydroxy-carboxylic acid or a mixture of two or more thereof; wherein the polyesterol according to (ii) is preferably selected from the group consisting of polycaprolactone, polylactic acid, 1,6-dioxacyclododecane-7,12-dion, oxacyclodecan-2-on and mixtures of two or more of these compounds.

Preferably, the at least one crystalline polyesterol of the mixture according to (ii) is a polyesterol based on a C2 to C10 dicarboxylic acid selected from the group consisting of adipic acid, azelaic acid sebacic acid, 12-dodecanedioic acid and mixtures of two or more of these dicarboxylic acids and a diol which is hexane-1,6-diol, neopentylglycol or a mixture of hexane-1,6diol and neopentylglycol; or
the at least one crystalline polyesterol of the mixture according to (ii) is a saturated polyesterol based on at least an alpha-omega-hydroxy-carboxylic acid, a cyclic oligomer of an alphaomega-hydroxy-carboxylic acid or a mixture of two or more thereof; wherein the at least one crystalline polyesterol of the mixture according to (ii) is preferably selected from the group consisting of polycaprolactone, polylactic acid, 1,6-dioxacyclododecane-7,12-dion, oxacyclodecan-2-on and mixtures of two or more of these compounds.

The carbodiimidization catalyst (i.3) may be any type of carbodiimidization catalyst known to those skilled in the art for producing a polycarbodiimide. In one embodiment of the thermosetting resin composition, the carbodiimidization catalyst (i.3) is selected from the group consisting of tertiary amides, basic metal compounds, carboxylic acid metal salts, non-basic organometallic compounds and phosphorous compounds. Specific carbodiimidization catalysts, which are incorporated herein by reference, are disclosed in [0047] to [0056] of WO 2015/123416 A1. In one preferred embodiment, the carbodiimidization catalyst (i.3) comprises at least one phospholene oxide, wherein the at least one phospholene oxide has the general formula (I)

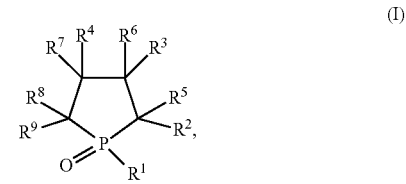

wherein
$R^1$ is a substituted or unsubstituted C1 to C15 hydrocarbon group;
$R^2$ or $R^4$ is selected from the group consisting of hydrogen atom, halogen atom, preferably chlorine atome (Cl), and C1 to C12 alkyl group, while the other of $R^2$, $R^4$ forms a double bond with $R^3$;
$R^5$, $R^6$, $R^7$,
$R^8$, $R^9$ are independently selected from the group consisting of hydrogen atom, halogen atom, preferably a chlorine atom, and C1 to C12 alkyl group.

Preferably, $R^1$ is selected from the group consisting of methyl, ethyl, propyl, isopropyl, n-butyl, tert-butyl, cyclohexyl, n-dodecyl, phenyl, o-, m- or p-tolyl, xylyl, napthyl, 4-diphenyl, 2-phenylethyl, 2-chloroethyl, 2-methoxy-ethyl, o-, m- or p-chlorophenyl, p-methoxyphenyl and p-N,N-dimethylaminophenyl; more preferred, $R^1$ is selected from the group consisting of a C2 to C4 alkyl group, phenyl group or benzyl group. The group out of $R^2$ or $R^4$ which does not form a double bond with $R^3$ preferably is H. Preferably, $R^5$ to $R^9$ are independently selected from the group consisting of hydrogen atom, chlorine atom, methyl, ethyl, propyl, isopropyl and butyl, wherein methyl is preferred. More preferred, each of $R^5$ to $R^9$ is H or methyl.

In one preferred embodiment, the phospholene oxide catalyst is selected from the group consisting of 1-methyl-1-oxo-phospholene, 1-phenyl-3-methyl-1-oxo-phospholene, 1-benzyl-3-methyl-1-oxo-phospholene, 1-ethyl-3-methyl-1-oxo-phospholene and mixtures of two or more of these phospholene oxide catalysts. Preferred catalysts are 1-methyl-1-oxo-phospholene, 1-phenyl-3-methyl-1-oxo-phospholene (3-methyl-1-phenyl-2-phospholene 1-oxide, MPPO) and mixtures of 1-methyl-1-oxo-phospholene and MPPO, MPPO being a particularly preferred catalyst.

In one embodiment of the thermosetting resin composition, said resin composition further comprises a catalyst (iii), which is usable as an isourea-bond-formation catalyst and is preferably selected from the group of metal containing catalysts; more preferred from the group consisting of alcoholates, carboxylates, acetoacetates and/or 2-4 pentadiones of alkali or earth alkali metals, preferably Na, K and/or Li, or metals from the group of Ti, Zr, Hf, V, Cu, Hg, Zn, Sn, Hg, Bi and Pb; more preferably the catalyst (iii) is selected from the group consisting of dimethyl tin carboxylate, dimethyltin dineodecanoate, tetraisopropyl orthotitanate, titanium isopropoxide and bismuth trineodecanoate.

The diisocyanate compound includes two isocyanate groups and is selected from the group consisting of aliphatic diisocyanates, aromatic diisocyanates and mixtures of two or more of these diisocyanates. Specific examples of aliphatic diisocyanate compounds include isophorone diisocyanates (IPDI), hexamethylene diisocyanates (HDI), dicyclohexylmethane diisocyanates (HMDI), cyclohexyl diisocyanates (CHDI), tetramethylxylene diisocyanates (TMXDI), and combinations thereof, as well as any isomers of these aliphatic diisocyanate compounds. Typically, however, the diisocyanate compound comprises an aromatic diisocyanate compound. In one embodiment of the thermosetting resin composition, the diisocyanate comprised in the polyisocyanate composition according to (i) is an aromatic diisocyanate, preferably selected from the group consisting of 2,2'-diphenyl methane diisocyanate (2,2'-MDI), 2,4'-diphenyl methane diisocyanate (2,4'-MDI), 4,4'-diphenyl methane diisocyanate (4,4'-MDI), 2,4-toluene diisocyanate (2,4-TDI), 2,6-toluene diisocyanate (2,6-TDI), and mixtures of two or more of these diisocyanates; more preferred selected from the group consisting of 2,4-toluene diisocyanate, 2,6-toluene diisocyanate and mixtures of 2,4-toluene diisocyanate and 2,6-toluene diisocyanate.

In the synthesis of the poly carbodiimide (i) a monofunctional compound (i.2) is used, which is a monofunctional compound selected from the group consisting of a monoisocyanate, an isocyanate reactive monofunctional compound and a mixture of monoisocyanate and isocyanate reactive monofunctional compound. A monoisocyante relates to an organic molecule that carries one isocyanate group, an isocyanate reactive monofunctional compound is an organic molecule that carries one isocyanate reactive group. The amount of monofunctional compound is required to regulate the molecular weight of the poly carbodiimide, the higher the amount of monofunctional compound that is used in the preparation of the poly carbodiimide the lower its molecular weight will be. The monoisocyanate can be aromatic or aliphatic, preferably aromatic. The monoisocyanate may be selected from the group consisting of phenyl isocyanate, toluyl isocyanate, naphthalene isocyanate and mixtures of two or more of these monoisocyanates. The compound with an isocyanate reactive group is selected from the group consisting of a monoalcohol, a monothiol, a monoamine, and mixtures of two or more of these isocyanate reactive monofunctional compounds, i.e. the compound with an isocyanate reactive group is an organic molecule that carries one group selected from alcohol, amine and thiol. The organic substituent may be aromatic or aliphatic, preferably aliphatic, which comprises straight chain, branched chain and cyclic aliphatics. The aliphatic substituent may contain one or more hetero element atoms, preferably selected from the group consisting of nitrogen atom, oxygen atom and sulphur atom, preferably oxygen atom. The isocyanate reactive group is preferably an alcohol, i.e. the isocyanate reactive monofunctional compound is preferably a monoalcohol, more preferred the monofunctional compound (i.2) is at least a monoalcohol. The number of carbon atoms and hetero element atoms of the organic substituent in sum may vary from 1-50, preferably from 2 to 20. In a preferred embodiment, the monoalcohol is selected from the group consisting of ethanol, propanol, butanol, pentanol, hexanol, heptanol, octanol, nonanol, decanol, 2-methyl-propan-1-ol, propan-2-ol, 2-ethyl-hexan-1-ol, cyclohexanol, 2-(2-ethoxy ethoxy) ethanol and mixtures of two or more of these monoalcohols, preferably from the group consisting of butanol, hexanol, 2 ethyl hexan-1-ol and mixtures of two or more thereof, more preferred the monoalcohol comprises, more preferred is, at least 2 ethyl hexan-1-ol.

According to one embodiment, the thermosetting resin composition is obtained or obtainable from the reaction of at least:
  i) a polycarbodiimide, wherein the number of carbodiimide groups per molecule is in the range of from 1 to 10;
  ii) a polyesterol,
  wherein the molar ratio of carbodiimide groups in the polycarbodiimide according to (i) to hydroxyl groups in the polyesterol according to (ii) is in the range of from 1:2 to 2:1; optionally in the presence of a catalyst (iii), which is preferably dimethyl tin carboxylate;
  wherein the polycarbodiimide according to (i) is a toluene diisocyanate-based polycarbodiimide obtained or obtainable from the reaction of at least:
    i.1) a polyisocyanate composition comprising at least TDI;
    i.2) a monofunctional compound which is 2-ethyl hexan-1-ol;
      in the presence of a carbodiimidization catalyst (i.3), which is preferably 3-methyl-1-phenyl-2-phospholene 1-oxide (MPPO); and
  wherein the polyesterol according to (ii) is a crystalline saturated copolyester based on hexane-1,6-dicarboxylic acid and hexane-1,6-diol.

Preferably, the thermosetting resin composition according to any one of claims 1 to 8, obtained or obtainable from the reaction of at least:
  i) a polycarbodiimide, wherein the number of carbodiimide groups per molecule is in the range of from 1 to 10;
  ii) a mixture of crystalline and amorphous polyols,
  wherein the molar ratio of carbodiimide groups in the polycarbodiimide according to (i) to hydroxyl groups in the mixture according to (ii) is in the range of from 1:2 to 2:1, and wherein at least 25 weight-% of the mixture according to (ii) consists of at least one crystalline polyesterol, based on the overall weight of the mixture being 100 weight-%;
  optionally in the presence of a catalyst (iii), which is preferably dimethyl tin carboxylate;
  wherein the polycarbodiimide according to (i) is a toluene diisocyanate-based polycarbodiimide obtained or obtainable from the reaction of at least:
    i.1) a polyisocyanate composition comprising at least TDI;
    i.2) a monofunctional compound which is 2-ethyl hexan-1-ol;
      in the presence of a carbodiimidization catalyst (i.3), which is preferably 3-methyl-1-phenyl-2-phospholene 1-oxide (MPPO); and
    wherein the at least one crystalline polyesterol of the mixture according to (ii) is a crystalline saturated copolyester based on hexane-1,6-dicarboxylic acid and hexane-1,6-diol.

Use of the Thermosetting Resin Composition

The present invention further relates to the use of a thermosetting resin composition as disclosed above as adhesive.

The thermosetting resin composition is used as two component adhesive (2K) or one component adhesive (1K), preferably as a 1K adhesive, more preferably as a 1K adhesive in the form of an adhesive film.

When used as adhesive, it could be shown that the use of the specific combination of pCDI with crystalline polyesterol resulted in superior properties, for Example a SAFT of more than 80° C., preferably more than 100° C., more preferred more than 120° C. Second, the specific molar ratio of carbodiimide groups in pCDI to hydroxyl groups in the crystalline polyesterol in the range of from 1:2 to 2:1 clearly improved the mechanical properties of the thermosetting resin, which is also apparent, for example, from the development of the shear force over time.

The adhesives can be universally used to bond a large variety of substrates, notably in adhering foils to foils or foils to substrates. A further embodiment is an application in which the 1 K adhesive film has been cast on a foil to which the adhesive adheres well. The foil so prepared can be stored for prolonged times and heat activated and applied on demand. Upon cooling the bond is formed and a stable composite is obtained. A further embodiment is that the foil is a decorative foil.

Process for Preparation of an Adhesive

The present invention further relates to a first process for preparation of an adhesive, preferably a 2K adhesive, comprising
- a) mixing of at least:
  - i) a polycarbodiimide, wherein the number of carbodiimide groups per molecule is in the range of from 1 to 10;
  - ii) a polyesterol,
  - iii) a catalyst, preferably an isourea forming catalyst;
  - wherein the molar ratio of carbodiimide groups in the polycarbodiimide according to (i) to hydroxyl groups in the polyesterol according to (ii) is in the range of from 1:2 to 2:1;
    - wherein the mixing according to (a) is done at a temperature above the melting temperature Tm of the polyesterol (ii), preferably at a temperature which is ≥Tm+10° C.; more preferred at a temperature which is in the range of from Tm+10° C. to Tm+50° C.; more preferred at a temperature in the range of from Tm+20° C. to Tm+40° C., thereby obtaining a mixture;
- b) applying the mixture obtained from (a) to at least one substrate, wherein the substrate has a temperature above 0° C., wherein applying is done at a temperature of the mixture above the melting temperature Tm of the polyesterol (ii), preferably at a temperature which is ≥Tm+10° C.; more preferred at a temperature which is in the range of from Tm+10° C. to Tm+50° C.; more preferred at a temperature in the range of from Tm+20° C. to Tm+40° C.;
- c) optionally curing the mixture on the at least one substrate at a temperature above the melting temperature Tm of the polyesterol (ii), preferably at a temperature in the range of from >Tm to 200° C., preferably from Tm+1° C. to 200 C, more preferably in the range of from 50 to 150° C.;
  - thereby obtaining an element comprising an adhesive layer on at least one substrate.

Preferably, the first process for preparation of an adhesive, preferably a 2K adhesive, comprises:
- a) mixing of at least:
  - i) a polycarbodiimide, wherein the number of carbodiimide groups per molecule is in the range of from 1 to 10;
  - ii) a mixture of crystalline and amorphous polyols,
  - iii) a catalyst, preferably an isourea forming catalyst;
  - wherein the molar ratio of carbodiimide groups in the polycarbodiimide according to (i) to hydroxyl groups in the mixture according to (ii) is in the range of from 1:2 to 2:1 and wherein at least 25 weight-% of the mixture according to (ii) consists of at least one crystalline polyesterol, based on the overall weight of the mixture being 100 weight-%;
  - wherein the mixing according to (a) is done at a temperature above the melting temperature Tm of the polyesterol (ii), preferably at a temperature which is ≥Tm+10° C.; more preferred at a temperature which is in the range of from Tm+10° C. to Tm+50° C.; more preferred at a temperature in the range of from Tm+20° C. to Tm+40° C., thereby obtaining a mixture;
- b) applying the mixture obtained from (a) to at least one substrate, wherein the substrate has a temperature above 0° C., wherein applying is done at a temperature of the mixture above the melting temperature Tm of the at least one crystalline polyesterol of the mixture according to (ii), preferably at a temperature which is ≥Tm+10° C.; more preferred at a temperature which is in the range of from Tm+10° C. to Tm+50° C.; more preferred at a temperature in the range of from Tm+20° C. to Tm+40° C.;
- c) optionally curing the mixture on the at least one substrate at a temperature above the melting temperature Tm of the at least one crystalline polyesterol of the mixture according to (ii), preferably at a temperature in the range of from >Tm to 200° C., preferably from Tm+1° C. to 200 C, more preferably in the range of from 50 to 150° C.;
  - thereby obtaining an element comprising an adhesive layer on at least one substrate;
  - wherein the curing according to (c) is preferably done for a time of more than 1 minute, more preferred for a time of more than 10 minutes, more preferred for a time of more than 20 minutes.

In one embodiment of this first process for preparation of an adhesive, the curing according to (c) is done for a time of more than 1 minute, preferred for a time of more than 10 minutes, more preferred for a time of more than 20 minutes.

In one embodiment of this first process for preparation of an adhesive, the at least one substrate comprises a first and a second substrate, wherein (b) comprises:
- b.1) applying the mixture obtained from (a) at least partially on at least one surface of the first substrate, wherein the substrate has a temperature above 0° C., wherein applying is done at a temperature of the mixture above the melting temperature Tm of the polyesterol (ii), preferably at a temperature which is ≥Tm+10° C.; more preferred at a temperature which is in the range of from Tm+10° C. to Tm+50° C.; more preferred at a temperature in the range of from Tm+20° C. to Tm+40° C., thereby obtaining a first substrate having a surface at least partially coated with the mixture obtained from (a);
- b.2) positioning the second substrate at least partially onto the coated surface of the first substrate, thereby obtaining an element comprising the first and second substrate and the mixture obtained from (a) between them;

and (c) comprises curing the mixture between first and second substrate at a temperature above the melting temperature Tm of the polyesterol (ii), preferably at a temperature in the range of from >Tm to 200° C., preferably from Tm+1° C. to 200 C, more preferably in the range of from 50 to 150° C., thereby obtaining an element comprising first and second substrate and an adhesive layer between them.

Preferably, the at least one substrate comprises a first and a second substrate, wherein (b) comprises:
- b.1) applying the mixture obtained from (a) at least partially on at least one surface of the first substrate, wherein the substrate has a temperature above 0° C., wherein applying is done at a temperature of the mixture above the melting temperature Tm of at least one crystalline the polyesterol of the mixture according to (ii), preferably at a temperature which is ≥Tm+10° C.; more preferred at a temperature which is in the range of from Tm+10° C. to Tm+50° C.; more preferred at a temperature in the range of from Tm+20° C. to Tm+40° C., thereby obtaining a first substrate having a surface at least partially coated with the mixture obtained from (a);
- b.2) positioning the second substrate at least partially onto the coated surface of the first substrate, thereby obtaining an element comprising the first and second substrate and the mixture obtained from (a) between them;
- and (c) comprises curing the mixture between first and second substrate at a temperature above the melting temperature Tm of the at least one crystalline polyesterol of the mixture according to (ii), preferably at a temperature in the range of from >Tm to 200° C., preferably from Tm+1° C. to 200 C, more preferably in the range of from 50 to 150° C., thereby obtaining an element comprising first and second substrate and an adhesive layer between them.

Another embodiment of the present invention is a second process for preparation of an adhesive, preferably a 1K adhesive, the process comprises:
- a) mixing of at least:
  - i) a polycarbodiimide, wherein the number of carbodiimide groups per molecule is in the range of from 1 to 10;
  - ii) a polyesterol,
  - iii) a catalyst, preferably an isourea forming catalyst;
  - wherein the molar ratio of carbodiimide groups in the polycarbodiimide according to (i) to hydroxyl groups in the polyesterol according to (ii) is in the range of from 1:2 to 2:1;
  - wherein the mixing according to (a) is done at a temperature above the melting temperature Tm of the polyesterol (ii), preferably at a temperature which is ≥Tm+10° C.; more preferred at a temperature which is in the range of from Tm+10° C. to Tm+50° C.; more preferred at a temperature in the range of from Tm+20° C. to Tm+40° C., thereby obtaining a mixture;
- b') casting the mixture obtained according to (a) on a surface of at least one substrate having a temperature in the range of from 0 to 150° C., thereby obtaining an adhesive film on the surface;
- c') optionally removing the adhesive film obtained according to (b') from the surface.

Preferably, the second process for preparation of an adhesive, preferably a 1K adhesive, comprises
- a) mixing of at least:
  - i) a polycarbodiimide, wherein the number of carbodiimide groups per molecule is in the range of from 1 to 10;
  - ii) a mixture of crystalline and amorphous polyols,
  - iii) a catalyst, preferably an isourea forming catalyst;
  - wherein the molar ratio of carbodiimide groups in the polycarbodiimide according to (i) to hydroxyl groups in the mixture according to (ii) is in the range of from 1:2 to 2:1;
  - wherein the mixing according to (a) is done at a temperature above the melting temperature Tm of the crystalline polyesterol of the mixture according to (ii), preferably at a temperature which is ≥Tm+10° C.; more preferred at a temperature which is in the range of from Tm+10° C. to Tm+50° C.; more preferred at a temperature in the range of from Tm+20° C. to Tm+40° C., thereby obtaining a mixture;
- b') casting the mixture obtained according to (a) on a surface of at least one substrate having a temperature in the range of from 0 to 150° C., thereby obtaining an adhesive film on the surface;
- c') optionally removing the adhesive film obtained according to (b') from the surface;
- wherein the casting according to (b') is preferably done at a temperature in the range of from 0° C. to ≤ the melting temperature Tm of the at least one crystalline polyesterol of the mixture according to (ii), more preferred at a temperature in the range of from 5° C. to Tm−10° C.; more preferred at a temperature in the range of from 10 to 30° C.

In one embodiment of this second process for preparation of an adhesive, the casting according to (b') is done at a temperature in the range of from 0° C. to ≤ the melting temperature Tm of the polyesterol (ii), preferably at a temperature in the range of from 5° C. to Tm−10° C.; more preferred at a temperature in the range of from 10 to 30° C.

In one embodiment of this second process for preparation of an adhesive, the at least one substrate comprises at least a first and a second substrate, comprising:
- d) applying the film obtained according to (b') or (c') at least partially on at least one surface of the first substrate, thereby obtaining a first substrate having a surface at least partially covered with the film obtained according to (b') or (c');
- e) positioning the second substrate at least partially onto the covered surface of the first substrate, thereby obtaining an element comprising the first and second substrate and the film obtained according to (b') or (c') between them;
- (f) curing the film between first and second substrate at a temperature above the melting temperature Tm of the polyesterol (ii), preferably at a temperature in the range of from >Tm to 200° C., preferably from Tm+1° C. to 200 C, more preferably in the range of from 50 to 150° C.;

thereby obtaining an element comprising first and second substrate and an adhesive layer between them.

The present invention further relates to an element comprising an adhesive layer on at least one substrate, obtained or obtainable from the first process as described above or from the second process as described above, preferably an element comprising a first and second substrate and an adhesive layer between them.

The present invention further relates to an adhesive film, obtained or obtainable from the second process as described above.

The present invention is further illustrated by the following embodiments and combinations according to embodiments as indicated by the respective dependencies and back-references. In particular, it is noted that in each instance where a range according to embodiments is mentioned, for Example in the context of a term such as "The . . . according to any of embodiments 1 to 4", every embodiment in this range is meant to be explicitly disclosed for the skilled person, i.e. the wording of this term is to be understood by the skilled person as being synonymous to "The . . . according to any of embodiments 1, 2, 3, and 4". Further, it is explicitly noted that the following set of embodiments is not the set of claims determining the extent of protection, but represents a suitably structured part of the description directed to general and preferred aspects of the present invention.

1. A thermosetting resin composition, in particular for the use as adhesive, obtained or obtainable from the reaction of at least:
   i) a polycarbodiimide, wherein the number of carbodiimide groups per molecule is in the range of from 1 to 10;
   ii) a mixture of crystalline and amorphous polyols;
   wherein the molar ratio of carbodiimide groups in the polycarbodiimide according to (i) to hydroxyl groups in the mixture according to (ii) is in the range of from 1:2 to 2:1, and wherein at least 25 weight-% of the mixture according to (ii) consists of at least one crystalline polyesterol, based on the overall weight of the mixture being 100 weight-%.

2. The thermosetting resin composition according to embodiment 1, wherein the polycarbodiimide according to (i) is obtained or obtainable from the reaction of at least:
   i.1) a polyisocyanate composition comprising at least one diisocyanate;
   i.2) a monofunctional compound selected from the group consisting of a monoisocyanate, an isocyanate reactive monofunctional compound, wherein the isocyanate reactive monofunctional compound is selected from the group consisting of a monoalcohol, a monothiol, a monoamine, and mixtures of two or more of these isocyanate reactive monofunctional compounds, and a mixture of monoisocyanate and isocyanate reactive monofunctional compound, preferably at least a monoalcohol;
   in the presence of a carbodiimidization catalyst (i.3).

3. The thermosetting resin composition according to embodiment 2, wherein the polycarbodiimide according to (i) is obtained or obtainable by
   a) mixing the polyisocyanate composition according to (i.1) with at least a part of the monofunctional compound according to (i.2) at a temperature $T_1$ thereby obtaining a first mixture;
   b) adding the catalyst (i.3) to the first mixture obtained in (a) at a temperature $T_2$ wherein $T_2$ is >$T_1$, thereby obtaining a precursor compound;
   b) adjusting the precursor compound obtained in (b) to a temperature $T_3$;
   c) adding the remaining part of the monofunctional compound according to (i.2) at temperature $T_3$; thereby obtaining the polycarbodiimide according to (i);
   wherein:
   $T_1$ is a temperature below 70° C., preferably a temperature in the range of from 5 to <70° C., more preferred in the range of from 5 to 69° C.;
   $T_2$ is a temperature ≥70° C., preferably a temperature in the range of from ≥70 to 150° C.; and
   $T_3$ is a temperature below 100° C., preferably a temperature in the range of from 5 to 100° C., more preferred in the range of from 5 to 99° C.

4. The thermosetting resin composition according to any one of embodiments 1 to 3, wherein the at least one crystalline polyesterol of the mixture according to (ii) has a melting temperature >30° C., preferably in the range of from >30 to 80° C., more preferred in the range of from 31 to 80° C.

5. The thermosetting resin composition according to any one of embodiments 1 to 4, wherein the at least one crystalline polyesterol of the mixture according to (ii) has a molecular weight in the range of from 500 to 5000 g/mol.

6. The thermosetting resin composition according to any one of embodiments 1 to 5, wherein at least 50 weight-%, more preferred at least 75 weight-% of the mixture of crystalline and amorphous polyols consists of at least one crystalline polyesterol, based on the overall weight of the mixture being 100 weight-%, wherein more preferably (ii) consists of one or more crystalline polyesterols.

7. The thermosetting resin composition according to any one of embodiments 1 to 6, wherein the at least one crystalline polyesterol of the mixture according to (ii) is a saturated polyesterol based on at least:
   (ii.1) a compound having at least two hydroxyl groups reactive towards ester formation;
   (ii.2) a compound having at least two carboxyl groups reactive towards ester formation;
   wherein:
   the compound (ii.1) having at least two hydroxyl groups reactive towards ester formation is preferably a saturated diol; more preferably a saturated C2 to C18 alkyl diol; more preferably a saturated C2 to C10 alkyl diol selected from the group consisting of 1,2-ethane diol, diethylene glycol, 1,2-propane diol, dipropylene glycol, 1,4-butane diol, 1,5-pentane diol, 1,6-hexane diol, neopentylglycol, and mixtures of two or more of these diols; and the compound (ii.2) having at least two carboxyl groups reactive towards ester formation is preferably selected from the group consisting of saturated dicarboxylic acid, anhydride of a saturated dicarboxylic acid, ester of a saturated dicarboxylic acid, and mixtures of two or more of these components, more preferably selected from the group consisting of of saturated C2 to C10 dicarboxylic acid and mixtures of two or more thereof, more preferred a saturated C2 to C10 dicarboxylic acid selected from the group consisting of succinic acid, glutaric acid, adipic acid, pimelic acid, suberic acid, azelaic acid, sebacic acid, 1,12-dodecanedioic acid, maleic acid, fumaric acid, hexahydrophthalic acid, hexahydroisophthalic acid, hexahydroterephthalic acid, 3,6,9-trioxaundecanedioic acid and mixtures of two or more of these dicarboxylic acids.

8. The thermosetting resin composition according to any one of embodiments 1 to 7, wherein the at least one crystalline polyesterol of the mixture according to (ii) is a polyesterol based on a C2 to C10 dicarboxylic acid selected from the group consisting of adipic acid, azelaic acid sebacic acid, 12-dodecanedioic acid and mixtures of two or more of these dicarboxylic acids and a diol which is hexane-1,6-diol, neopentylglycol or a mixture of hexane-1,6-diol and neopentylglycol.

9. The thermosetting resin composition according to any one of embodiments 1 to 6, wherein the at least one crystalline polyesterol of the mixture according to (ii) is a saturated polyesterol based on at least an alpha-omega-hydroxy-carboxylic acid, a cyclic oligomer of an alpha-omega-hydroxy-carboxylic acid or a mixture of two or more thereof; wherein the at least one crystalline polyesterol of the mixture according to (ii)

is preferably selected from the group consisting of polycaprolactone, polylactic acid, 1,6-dioxacyclododecane-7,12dion, oxacyclodecan-2-on and mixtures of two or more of these compounds.

10. The thermosetting resin composition according to any one of embodiments 2 to 9, wherein the carbodiimidization catalyst (i.3) is selected from the group consisting of tertiary amides, basic metal compounds, carboxylic acid metal salts, non-basic organometallic compounds and phosphorous compounds, preferably the carbodiimidization catalyst (i.3) comprises at least one phospholene oxide, wherein the at least one phospholene oxide has the general formula (I)

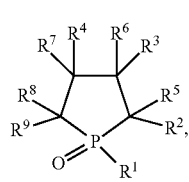

(I)

wherein
$R^1$ is a substituted or unsubstituted C1 to C15 hydrocarbon group;
$R^2$ or $R^4$ is selected from the group consisting of hydrogen atom, halogen atom, preferably Cl, and C1 to C12 alkyl group, while the other of $R^2$, $R^4$ forms a double bond with $R^3$;
$R^5$, $R^6$, $R^7$, $R^8$, $R^9$ are selected from the group consisting of hydrogen atom, halogen atom, preferably a chlorine atom, and C1 to C12 alkyl group.

11. The thermosetting resin composition according to any one of embodiments 1 to 10, further comprising a catalyst (iii), which is usable as an isourea-bond-formation catalyst and is preferably selected from the group of metal containing catalysts; more preferred from the group consisting of alcoholates, carboxylates, acetoacetates and/or 2-4 pentadiones of alkali or earth alkali metals, preferably Na, K and/or Li, or metals from the group of Ti, Zr, Hf, V, Cu, Hg, Zn, Sn, Hg, Bi and Pb; more preferably the catalyst (iii) is selected from the group consisting of dimethyl tin carboxylate, dimethyltin dineodecanoate, tetraisopropyl orthotitanate, titanium isopropoxide and bismuth trineodecanoate.

12. The thermosetting resin composition according to any one of embodiments 1 to 11, wherein the diisocyanate comprised in the polyisocyanate composition according to (i) is an aromatic diisocyanate, preferably selected from the group consisting of 2,2'-diphenyl methane diisocyanate (2,2'-MDI), 2,4'-diphenyl methane diisocyanate (2,4'-MDI), 4,4'diphenyl methane diisocyanate (4,4'-MDI), 2,4-toluene diisocyanate (2,4-TDI), 2,6-toluene diisocyanate (2,6-TDI), and mixtures of two or more of these diisocyanates; more preferred selected from the group consisting of 2,4-toluene diisocyanate, 2,6-toluene diisocyanate and mixtures of 2,4-toluene diisocyanate and 2,6-toluene diisocyanate.

13. The thermosetting resin composition according to any one of embodiments 1 to 12 obtained or obtainable from the reaction of at least:
i) a polycarbodiimide, wherein the number of carbodiimide groups per molecule is in the range of from 1 to 10;
ii) a mixture of crystalline and amorphous polyols;
wherein the molar ratio of carbodiimide groups in the polycarbodiimide according to (i) to hydroxyl groups in the mixture according to (ii) is in the range of from 1:2 to 2:1, and wherein at least 25 weight-% of the mixture according to (ii) consists of at least one crystalline polyesterol, based on the overall weight of the mixture being 100 weight-%; optionally in the presence of a catalyst (iii), which is preferably dimethyl tin carboxylate;
wherein the polycarbodiimide according to (i) is a toluene diisocyanate-based polycarbodiimide obtained or obtainable from the reaction of at least:
i.1) a polyisocyanate composition comprising at least TDI;
i.2) a monofunctional compound which is 2-ethyl hexan-1-ol;
in the presence of a carbodiimidization catalyst (i.3), which is preferably 3-methyl-1phenyl-2-phospholene 1-oxide (MPPO); and
wherein the at least one crystalline polyesterol of the mixture according to (ii) is a crystalline saturated copolyester based on hexane-1,6dicarboxylic acid and hexane-1,6-diol.

14. Use of a thermosetting resin composition according to any one of embodiments 1 to 13 as adhesive.

15. The use according to embodiment 14 as two component adhesive (2K) or one component adhesive (1K), preferably as a 1K adhesive, more preferably as a 1K adhesive in the form of an adhesive film.

16. A process for preparation of an adhesive, preferably a 2K adhesive, comprising
a) mixing of at least:
i) a polycarbodiimide, wherein the number of carbodiimide groups per molecule is in the range of from 1 to 10;
ii) a mixture of amorphous and crystalline polyols;
iii) a catalyst, preferably an isourea forming catalyst;
wherein the molar ratio of carbodiimide groups in the polycarbodiimide according to (i) to hydroxyl groups in the mixture according to (ii) is in the range of from 1:2 to 2:1, and wherein at least 25 weight-% of the mixture according to (ii) consists of at least one crystalline polyesterol, based on the overall weight of the mixture being 100 weight-%;
wherein the mixing according to (a) is done at a temperature above the melting temperature Tm of the at least one crystalline polyesterol of the mixture according to (ii), preferably at a temperature which is ≥Tm+10° C.; more preferred at a temperature which is in the range of from Tm+10° C. to Tm+50° C.; more preferred at a temperature in the range of from Tm+20° C. to Tm+40° C., thereby obtaining a mixture;
b) applying the mixture obtained from (a) to at least one substrate, wherein the substrate has a temperature above 0° C., wherein applying is done at a temperature of the mixture above the melting temperature Tm of the at least one crystalline polyesterol of the mixture according to (ii), preferably at a temperature which is ≥Tm+10° C.; more preferred at a temperature which is in the range of from Tm+10° C. to Tm+50° C.; more preferred at a temperature in the range of from Tm+20° C. to Tm+40° C.;
c) optionally curing the mixture on the at least one substrate at a temperature above the melting temperature Tm of the at least one crystalline polyesterol of the mixture according to (ii), preferably at a temperature in the range of from >Tm to 200° C., preferably from Tm+1° C. to 200 C, more preferably in the range of from 50 to 150° C.;
thereby obtaining an element comprising an adhesive layer on at least one substrate.

17. The process according to embodiment 16, wherein the curing according to (c) is done for a time of more than 1 minute, preferred for a time of more than 10 minutes, more preferred for a time of more than 20 minutes.

18. The process according to embodiment 16 or 17, wherein the at least one substrate comprises a first and a second substrate, wherein (b) comprises:
 b.1) applying the mixture obtained from (a) at least partially on at least one surface of the first substrate, wherein the substrate has a temperature above 0° C., wherein applying is done at a temperature of the mixture above the melting temperature Tm of the at least one crystalline polyesterol of the mixture according to (ii), preferably at a temperature which is ≥Tm+10° C.; more preferred at a temperature which is in the range of from Tm+10° C. to Tm+50° C.; more preferred at a temperature in the range of from Tm+20° C. to Tm+40° C., thereby obtaining a first substrate having a surface at least partially coated with the mixture obtained from (a);
 b.2) positioning the second substrate at least partially onto the coated surface of the first substrate, thereby obtaining an element comprising the first and second substrate and the mixture obtained from (a) between them;
and (c) comprises curing the mixture between first and second substrate at a temperature above the melting temperature Tm of the at least one crystalline polyesterol of the mixture according to (ii), preferably at a temperature in the range of from >Tm to 200° C., preferably from Tm+1° C. to 200 C, more preferably in the range of from 50 to 150° C., thereby obtaining an element comprising first and second substrate and an adhesive layer between them.

19. A process for preparation of an adhesive, preferably a 1K adhesive, comprising
 a) mixing of at least:
  i) a polycarbodiimide, wherein the number of carbodiimide groups per molecule is in the range of from 1 to 10;
  ii) a mixture of amorphous and crystalline polyols;
  iii) a catalyst, preferably an isourea forming catalyst;
  wherein the molar ratio of carbodiimide groups in the polycarbodiimide according to (i) to hydroxyl groups in the mixture according to (ii) is in the range of from 1:2 to 2:1, and wherein at least 25 weight-% of the mixture according to (ii) consists of at least one crystalline polyesterol, based on the overall weight of the mixture being 100 weight-%;
  wherein the mixing according to (a) is done at a temperature above the melting temperature Tm of the at least one crystalline polyesterol of the mixture according to (ii), preferably at a temperature which is ≥Tm+10° C.; more preferred at a temperature which is in the range of from Tm+10° C. to Tm+50° C.; more preferred at a temperature in the range of from Tm+20° C. to Tm+40° C., thereby obtaining a mixture;
 b') casting the mixture obtained according to (a) on a surface of at least one substrate having a temperature in the range of from 0 to 150° C., thereby obtaining an adhesive film on the surface;
 c') optionally removing the adhesive film obtained according to (b') from the surface.

20. The process according to embodiment 19, wherein the casting according to (b') is done at a temperature in the range of from 0° C. to ≤ the melting temperature Tm of the at least one crystalline polyesterol of the mixture according to (ii), preferably at a temperature in the range of from 5° C. to Tm−10° C.; more preferred at a temperature in the range of from 10 to 30° C.

21. The process according to embodiment 19 or 20, wherein the at least one substrate comprises at least a first and a second substrate, comprising:
 d) applying the film obtained according to (b') or (c') at least partially on at least one surface of the first substrate, thereby obtaining a first substrate having a surface at least partially covered with the film obtained according to (b') or (c');
 e) positioning the second substrate at least partially onto the covered surface of the first substrate, thereby obtaining an element comprising the first and second substrate and the film obtained according to (b') or (c') between them;
 (f) curing the film between first and second substrate at a temperature above the melting temperature Tm of the at least one crystalline polyesterol of the mixture according to (ii), preferably at a temperature in the range of from >Tm to 200° C., preferably from Tm+1° C. to 200 C, more preferably in the range of from 50 to 150° C.; thereby obtaining an element comprising first and second substrate and an adhesive layer between them.

22. An element comprising an adhesive layer on at least one substrate, obtained or obtainable from the process of any one of embodiments 16 to 18 or from the process of any one of embodiments 19 to 21, preferably an element comprising a first and second substrate and an adhesive layer between them.

23. An adhesive film, obtained or obtainable from the process according to embodiment 19 or 20.

The present invention is further illustrated by the following reference Examples, Comparative Examples, and Examples.

EXAMPLES

1. Chemicals

TABLE 1

Components used

| Ingredient | Structure | Characteristic properties |
|---|---|---|
| Polyesterol 1 (cPESOL) | Partially crystalline saturated copolyester based on hexane-1,6-dicarboxylic acid and hexane-1,6-diol | HV 30 mg KOH/g; melting point 55° C.*; molecular weight 3500 g/mol |
| Polyesterol 2 | Amorphous saturated copolyester | HV 348 mg KOH/g |
| Polyetherol 1 | Polyether polyol | HV 400 mg KOH/g |
| Polyetherol 2 | Polypropylene glycol | HV 56 mg KOH/g |

TABLE 1-continued

Components used

| Ingredient | Structure | Characteristic properties |
|---|---|---|
| Polyetherol 3 | Polypropylene glycol | HV 104 mg KOH/g |
| Diol | 1,4-Butanediol | HV 1245 mg KOH/g |
| Catalyst 1 | 3-methyl-1-phenyl-2-phospholene 1-oxide (MPPO) | |
| Catalyst 2 | Dimethyl tin carboxylate | AV 215 mg KOH/g |
| Isocyanate | TDI 80 (80:20 mixture of the 2,4- and 2,6-isomers of toluene diisocyanate) | NCO content 48.2% |

*Melting point of cPESOL as indicated by supplier

2. Measuring Methods

Hydroxyl value (HV): DIN 53240
Acid value (AV): DIN EN ISO 14898
NCO content: DIN EN ISO 14896
N=C=N content: oxalic acid method published by W. Adam and F. Yany, 676 Analytical Chemistry, Vol. 49, No. 4, April 1977
residual TDI monomer: DIN EN ISO 10283
lap shear strength: Sample preparation ISO 4587/DIN EN 1465, measurement ISO 4587/DIN EN 6060
tensile force: ISO 4587/DIN EN 6060
Shear Adhesion Failure Temperature (SAFT): analogy to ASTM D4498 using an air circulated oven

3. Reference Example, Examples and Comparative Examples

Reference Example 1—Preparation of a Toluene Diisocyanate-Based Polycarbodiimide (pCDI)

A 80:20 mixture of the 2,4- and 2,6-isomers of toluene diisocyanate (TDI) (500.0 g) was placed in a flask and cooled with a water/ice bath. While stirring 2-ethyl hexan-1-ol (157.2 g) was added dropwise, maintaining temperature below 25° C. After completion of the reaction the content of the flask was heated to 100° C. When reaching 75° C., 30.0 g of Catalyst 1 (3-methyl-1-phenyl-2-phospholene 1-oxide, MPPO) solution (5 wt % in butyl acetate) was added and after reaching 100° C., the mixture was stirred at a constant temperature of 100° C. for 75 min. The product was cooled below 50° C. and the NCO content (determined according to DIN EN ISO 14896: Plastics—Polyurethane raw materials—Determination of isocyanate content) was determined as 9.49 wt %. Based on the NCO content another 178.6 g of 2-ethyl hexan-1-ol was added dropwise to achieve a theoretical NCO content of 0.0 wt % maintaining temperatures below 70° C. After complete addition the mixture was stirred at 60° C. until the reaction was finished. The material was left at room temperature overnight. For transfer to another container it was heated to 70° C. The N=C=N content (determined according to the oxalic acid method published by W. Adam and F. Yany, 676 Analytical Chemistry, Vol. 49, No. 4, April 1977) was determined as 6.90 wt %, NCO content as 0.17 wt % and residual TDI monomer (determined according to DIN EN ISO 10283: Binders for paints and varnishes—Determination of monomeric diisocyanates in polyisocyanate resins) as <0.01 wt %. The butyl acetate was removed using a rotary evaporator at 10 mbar and an oil bath at 100° C.

Examples 2-7—2 K Adhesives

Description of the 2 K Experimental Procedure:

The samples for the determination of the lap shear strength (lap shear strength 0.3 mm) were prepared in close accordance to ISO 4587/DIN EN 1465; the compositions are indicated in Table 2. Adhesive compositions according to Table 2 were prepared in that polyesterol 1 and pCDI of Reference Example 1 were both conditioned at 90° C. Catalyst 2 was added to Polyesterol 1 and premixed using a spatula. The pCDI was added and the blend was homogenized using a Speedmixer™ (Hauschild Engineering, Germany) for 30 seconds at 1600 rpm. Subsequently a sufficient amount of the reaction mixture to slightly overfill the 25 mm×12.5 mm×0.3 mm joint of the bond was put onto a wooden test bar (beech wood, 100 mm×25 mm×5 mm, Rochell GmbH, Germany) and a second wooden test bar was pressed onto the adhesive with low force. The joint was assembled by positioning the test bars with 12.5 mm overlap. The thickness of the adhesive layer was set at 0.3 mm using metal spacers. The test specimen was fixed in a mold by positioning a weight of 434 g on the joint and allowed to cure for 30 min in an oven at 130° C. After cooling to room temperature, the weight was removed and the samples were left at room temperature for at least a week prior to testing. The lap shear strength was determined at a crosshead speed of 5 mm/min and was calculated from the measured tensile force divided by the overlap area. For each series the average value of the lap shear strength was recorded, the experimental error typically amounted to 10%. The sample systems 4, 5 and 6 have also been tested using steel sheets (100 mm×25 mm×1 mm, Rochell GmbH, Germany). The SAFT (Shear Adhesion Failure Temperature) determination was carried out in analogy to ASTM D4498 using an air circulated oven. Prior to the determination the oven was preheated to 80° C. A lap shear test specimen was fixed at one end and held in a vertical position, the other—lower end was equipped with a weight of 100 g. In case the adhesive joint holds at 80° C. for 30 minutes the temperature was increased stepwise in 10° C. intervals keeping the sample for 30 minutes at each temperature till the bond fails. The highest temperature at which the bond remains stable for half an hour was recorded as SAFT. The mechanical and SAFT properties results were given in Table 3. The abbreviation n.d. stands for not determined.

TABLE 2

Formulations

| | Example 2 | Example 3 | Example 4 | Example 5 | Example 6 | Example 7 |
|---|---|---|---|---|---|---|
| Polyesterol 1 [wt %] | 93.03 | 80.65 | 76.93 | 72.73 | 68.97 | 57.15 |
| Catalyst 2 [wt %] | 0.3 | 0.3 | 0.3 | 0.3 | 0.3 | 0.3 |

TABLE 2-continued

Formulations

| | Example 2 | Example 3 | Example 4 | Example 5 | Example 6 | Example 7 |
|---|---|---|---|---|---|---|
| pCDI [wt %] | 6.97 | 19.35 | 23.07 | 27.27 | 31.03 | 42.85 |
| Index | 25 | 80 | 100 | 125 | 150 | 250 |
| molar ratio of carbodiimide groups in pCDI to hydroxyl groups in polyesterol | Outside range of 1:2 to 2:1 | | Within range of 1:2 to 2:1 | | | Outside range of 1:2 to 2:1 |

TABLE 3

Mechanical properties

| | Unit | Example 2 | Example 3 | Example 4 | Example 5 | Example 6 | Example 7 |
|---|---|---|---|---|---|---|---|
| Index | | 25 | 80 | 100 | 125 | 150 | 250 |
| Wooden specimen | | | | | | | |
| Maximum Force | [N] | 510 | 1680 | 1370 | 1430 | 1390 | 1310 |
| Lap shear strength | [M Pa] | 1.5 | 4.9 | 3.7 | 3.8 | 4.0 | 3.7 |
| SAFT | [° C.] | <80 | 140 | 130 | 130 | 120 | <80 |
| Steel specimen | | | | | | | |
| Maximum force | [N] | n.d. | n.d. | 1010 | 1510 | 1730 | n.d. |
| Lap shear strength | [MPa] | n.d. | n.d. | 3.1 | 4.6 | 5.3 | n.d. |

It is apparent that for Examples 3-6, where the molar ratio of carbodiimide groups in pCDI to hydroxyl groups in polyesterol is in the range of from 1:2 to 2:1, the mechanical properties are superior (especially SAFT) compared to Examples 2 and 7, where the molar ratio of carbodiimide groups in pCDI to hydroxyl groups in polyesterol is outside of the range of from 1:2 to 2:1.

For the samples 3, 4, 5 and 6 the strength development of the joint of the bond as a function of time has been determined using wooden test bars. The sample preparation procedure for the lap shear test specimens was identical to that described above with this exception that the samples were not cured at 130° C. for half an hour. Instead the development of strength as a function of time of the fresh specimen was measured. The results were given in Table 4.

TABLE 4

Strength build-up for Examples 3, 4, 5 and 6

| | Unit | Example 3 | Example 4 | Example 5 | Example 6 |
|---|---|---|---|---|---|
| Shear force after 1 min | [N] | n.d. | n.d. | 9.07 | 8.16 |
| Shear force after 1.5 min | [N] | 484 | 459 | n.d. | n.d. |
| Shear force after 2 min | [N] | n.d. | n.d. | 555 | 435 |
| Shear force after 2.25 min | [N] | 523 | 522 | n.d. | n.d. |
| Shear force after 3 min | [N] | 545 | 561 | 624 | 524 |
| Shear force after 4 min | [N] | 648 | 620 | 604 | 560 |

Example 3-6 show that the strength build-up of the adhesive bond occurs in a reasonable time span and that after about 4 minutes the strength has built up to about 30-40% of its final strength.

Comparative Examples 1-5—2K Adhesives

For the Comparative Examples wooden test bars were employed. The adhesive recipes are given in Table 5. The polyols employed in Comparative Example 1 to 3 were amorphous. In Comparative Example 4 straight polyesterol 1 was used to prepare the joint of the bond whereas in Comparative Example 5 straight pCDI was used. For the preparation of Comparative samples 4 and 5 polyesterol 1 and pCDI were preconditioned and applied at 90° C. The strength build-up of Comparative Examples 1-4 is given in Table 6. The lap shear strength and SAFT of the Comparative Examples 4 and 5 is given in Table 7.

TABLE 5

Formulations of the Comparative Examples 1-3 and Comparative Examples 4,5 respectively

|  | Comparative Example 1 | Comparative Example 2 | Comparative Example 3 | Comparative Example 4 | Comparative Example 5 |
|---|---|---|---|---|---|
| Diol [wt %] | 7.44 | — | — | — | — |
| Polyesterol 1 [wt %] | — | — | — | 100 | — |
| Polyetherol 1 [wt %] | — | 20.00 | — | — | — |
| Polyesterol 2 [wt %] | — | — | 22.33 | — | — |
| Catalyst 2 [wt %] | 0.3 | 0.3 | 0.3 | — | — |
| pCDI [wt %] | 92.56 | 80.00 | 77.67 | — | 100 |
| Index | 100 | 100 | 100 | — | — |
| molar ratio of carbodiimide groups in pCDI to hydroxyl groups in polyesterol | Within range of 1:2 to 2:1 | | | — | — |

TABLE 6

Strength build-up for Comparative Examples 1 to 4

|  | Unit | Comparative Example 1 | Comparative Example 2 | Comparative Example 3 | Comparative Example 4 (straight Polyesterol 1) |
|---|---|---|---|---|---|
| Shear force after 2 min | [N] | n.d. | n.d. | n.d. | 317 |
| Shear force after 4 min | [N] | n.d. | n.d. | n.d. | 312 |
| Shear force after 5 min | [N] | 2 | n.d. | 0 | n.d. |
| Shear force after 10 min | [N] | n.d. | 0 | n.d. | n.d. |
| Shear force after 15 min | [N] | n.d. | n.d. | 0 | n.d. |
| Shear force after 20 min | [N] | 2 | n.d. | n.d. | n.d. |
| Shear force after 45 min | [N] | 2 | 1 | 0 | n.d. |

TABLE 7

Mechanical properties of Comparative Examples 4 and 5

|  | Unit | Comparative Example 4: Polyesterol 1 | Comparative Example 5 (straight pCDI) |
|---|---|---|---|
| Maximum force | [N] | 400 | 250 |
| Lap shear strength | [MPa] | 1.2 | 0.6 |
| SAFT | [° C.] | <80 | <80 |

It is apparent from the comparison of Examples 3-6 with Comparative Examples 1 to 5, that the specific combination of pCDI and a crystalline Polyesterpolyol, here Polyesterpolyol 1, gave superior properties, especially a clearly higher shear force when the molar ratio of carbodiimide groups in pCDI to hydroxyl groups in the crystalline polyesterol was in the range of from 1:2 to 2:1. For polyesterols different from a crystalline polyesterol, even if the molar ratio of carbodiimide groups in pCDI to hydroxyl groups in the polyesterol was in the range of from 1:2 to 2:1, the development of the shear force was inferior.

Example 8-11—1K Adhesives/Adhesive Films

Description of the 1K Experimental Procedure:

Polyesterol 1 and pCDI of Reference Example 1 were both conditioned at 90° C. Catalyst 2 was added to polyesterol 1 and premixed using a spatula. The pCDI was added and the blend was homogenized using a Speedmixer™ for 30 seconds at 1600 rpm. The mixture so obtained was drawn to a film with a thickness of 500 µm on a preheated Teflon® sheet that was fixed on a hot plate having a temperature of 130° C. using a doctor blade. The film was cured at this temperature (130° C.) for 30 min. Subsequently the Teflon sheet was taken from the hot plate and cooled to room temperature. The film could easily be removed from the Teflon sheet. A dry, tack-free and flexible film was obtained. A sample with dimensions of 25 mm×12.5 mm was cut from the film and positioned between two test wooden bars such that the overlap of the bars amounts to 12.5 mm. The assembly was clamped using a universal double clip and put in an air circulated oven having a temperature of 130° C. for 30 min. After cooling the clamp was removed. The test specimens were stored for at least two weeks in the lab prior to testing. The film formulations and the corresponding adhesive properties were given in Table 8 and 9, respectively.

TABLE 8

Formulations of 1K Examples 8 to 11

|  | Example 8 | Example 9 | Example 10 | Example 11 |
|---|---|---|---|---|
| Polyesterol 1 [wt %] | 93.03 | 76.93 | 68.97 | 57.15 |

TABLE 8-continued

Formulations of 1K Examples 8 to 11

|  | Example 8 | Example 9 | Example 10 | Example 11 |
|---|---|---|---|---|
| Catalyst 2 [wt %] | 0.3 | 0.3 | 0.3 | 0.3 |
| pCDI [wt %] | 6.97 | 23.07 | 31.03 | 42.85 |
| Index | 25 | 100 | 150 | 250 |
| molar ratio of carbodiimide groups in pCDI to hydroxyl groups in polyesterol | Outside range of 1:2 to 2:1 | Within range of 1:2 to 2:1 | Within range of 1:2 to 2:1 | Outside range of 1:2 to 2:1 |

TABLE 9

Mechanical properties of 1K Examples 8 to 11

|  | Unit | Example 8 | Example 9 | Example 10 | Example 11 |
|---|---|---|---|---|---|
| Index |  | 25 | 100 | 150 | 250 |
| Maximum force | [N] | n.d. | 750 | 930 | n.d. |
| Lap shear strength | [MPa] | n.d. | 1.9 | 2.7 | n.d. |
| SAFT test passed temperature | [° C.] | <80 | 170 | 160 | 80 |

It is apparent that for Examples 9 and 10, where the molar ratio of carbodiimide groups in pCDI to hydroxyl groups in polyesterol is in the range of from 1:2 to 2:1, the mechanical properties are superior (especially SAFT) compared to Examples 8 and 11, where the molar ratio of carbodiimide groups in pCDI to hydroxyl groups in polyesterol is outside of the range of from 1:2 to 2:1.

Example 12-14

The adhesive films of Examples 12-14 were prepared as described above for the Examples 8-11 with the difference that the temperature of drawing was at room temperature (temperature in the range of from 20 to 25° C.). Dry, tack-free and flexible film were obtained. The adhesive joint was prepared as described above for Example 8-11. The film formulations and the corresponding adhesive and SAFT properties were given in Table 10 and 11, respectively.

TABLE 10

Formulations of 1K Examples 12 to 14

|  | Example 12 | Example 13 | Example 14 |
|---|---|---|---|
| Polyesterol 1 [wt %] | 76.93 | 72.73 | 68.97 |
| Catalyst 2 [wt %] | 0.3 | 0.3 | 0.3 |
| pCDI [wt %] | 23.07 | 27.27 | 31.03 |
| Index | 100 | 125 | 150 |
| molar ratio of carbodiimide groups in pCDI to hydroxyl groups in polyesterol | Within range of 1:2 to 2:1 | | |

TABLE 11

Mechanical properties of 1K Examples 12 to 14

|  | Unit | Example 12 | Example 13 | Example 14 |
|---|---|---|---|---|
| Index |  | 100 | 125 | 150 |
| Lap shear strength | [MPa] | 2.6 | 4.0 | 3.1 |
| Maximum force | [N] | 900 | 1420 | 1050 |
| SAFT | [° C.] | 150 | 150 | 150 |

It is apparent that for Examples 12-14, where first, the molar ratio of carbodiimide groups in pCDI to hydroxyl groups in polyesterol is in the range of from 1:2 to 2:1 and second, the temperature at which the film was prepared was below the melting temperature of the polyesterol (drawing done at room temperature instead of 130° C.), further improved properties were obtained vis a vis experiment 9-11 where the film was prepared at a temperature above the melting temperature of the polyesterol.

Comparative Example 6-8—Comparative 1K Adhesives

The adhesive film recipes of the Comparative Examples 6-8 were given in Table 12. The polyols employed were amorphous. The adhesive films for the Comparative samples 6-8 were prepared according to the procedure described above for Example 8-11.

TABLE 12

Formulations of Comparative Examples 6 to 8

|  | Comparative Example 6 | Comparative Example 7 | Comparative Example 8 |
|---|---|---|---|
| Polyetherol 2 [wt %] | 82.4 | 82.4 | — |
| Polyetherol 3 [wt %] | — | — | 71.7 |
| Catalyst 2 [wt %] | 0.5 | 1.0 | 1.0 |
| pCDI [wt %] | 17.6 | 17.6 | 28.3 |
| Index | 100 | 100 | 100 |
| molar ratio of carbodiimide groups in pCDI to hydroxyl groups in polyol | Within range of 1:2 to 2:1 | | |

The obtained films of Comparative Examples 6 to 8 were soft and sticky and not suitable for adhesive applications. When the drawing was performed at room temperature the films of the Examples 6-8 stayed liquid and could not be removed from the Teflon sheet.

Consequently, it is apparent that the use of a polyol different from polyesterol, even if the molar ratio of carbodiimide groups in pCDI to hydroxyl groups in the polyol is in the range of from 1:2 to 2:1, the mechanical properties are inferior (especially SAFT).

Overall, it is apparent from the Examples and Comparative Examples that the use of the specific combination of pCDI with crystalline polyesterol resulted in superior properties, for Example a SAFT of more than 80° C., preferably more than 100° C., more preferred more than 120° C. Second, the specific molar ratio of carbodiimide groups in pCDI to hydroxyl groups in the crystalline polyesterol in the range of from 1:2 to 2:1 clearly improved the mechanical properties of the thermosetting resin, which is also apparent, for Example, from the development of the shear force over time.

CITED LITERATURE

U.S. Pat. No. 5,079,326 A
Chemistry and technology of carbodiimides', Henri Ulrich, Wiley, Hoboken, USA, 2007
WO 2015/127041 A1
WO 2015/123416 A1
EP 0 381 324 A1
W. Adam and F. Yany, Analytical Chemistry, Vol. 49, No. 4, April 1977, 676
WO2016/026807 A1
WO 2015/127038 A1

The invention claimed is:

1. A thermosetting resin composition, obtained from the reaction of at least:
   i) a polycarbodiimide, wherein the number of carbodiimide groups per molecule is in the range of from 2 to 10; and
   ii) a mixture of crystalline and amorphous polyols,
   wherein the molar ratio of carbodiimide groups in the polycarbodiimide according to (i) to hydroxyl groups in the mixture according to (ii) is in the range of from 1:2 to 2:1, and wherein at least 25 weight-% of the mixture according to (ii) consists of at least one crystalline polyesterol, based on the overall weight of the mixture being 100 weight-%.

2. The thermosetting resin composition according to claim 1, wherein the polycarbodiimide according to (i) is obtained from the reaction of at least:
   i.1) a polyisocyanate composition comprising at least one diisocyanate; and
   i.2) a monofunctional compound selected from the group consisting of a monoisocyanate, an isocyanate reactive monofunctional compound, wherein the isocyanate reactive monofunctional compound is selected from the group consisting of a monoalcohol, a monothiol, a monoamine, and mixtures of two or more of these isocyanate reactive monofunctional compounds, and a mixture of monoisocyanate and isocyanate reactive monofunctional compound;
   in the presence of a carbodiimidization catalyst (i.3).

3. The thermosetting resin composition according to claim 2, wherein the polycarbodiimide according to (i) is obtained by
   a) mixing the polyisocyanate composition according to (i.1) with at least a part of the monofunctional compound according to (i.2) at a temperature Ti thereby obtaining a first mixture;
   b) adding the catalyst (i.3) to the first mixture obtained in (a) at a temperature $T_2$ wherein $T_2$ is $>T_1$, thereby obtaining a precursor compound;
   c) adjusting the precursor compound obtained in (b) to a temperature $T_3$; and
   d) adding the remaining part of the monofunctional compound according to (i.2) at temperature $T_3$; thereby obtaining the polycarbodiimide according to (i);
   wherein:
   $T_1$ is a temperature below 70° C.;
   $T_2$ is a temperature ≥70° C.; and
   $T_3$ is a temperature below 100° C.

4. The thermosetting resin composition according to claim 1, wherein the at least one crystalline polyesterol of the mixture according to (ii) has a melting temperature >30° C.

5. The thermosetting resin composition according to claim 1, wherein the at least one crystalline polyesterol of the mixture according to (ii) has a molecular weight in the range of from 500 to 5000 g/mol.

6. The thermosetting resin composition according to claim 1, wherein at least 50 weight-% of the mixture of crystalline and amorphous polyols consists of at least one crystalline polyesterol, based on the overall weight of the mixture being 100 weight-%.

7. The thermosetting resin composition according to claim 1, wherein the at least one crystalline polyesterol of the mixture according to (ii) is a saturated polyesterol based on at least:
   (ii.1) a compound having at least two hydroxyl groups reactive towards ester formation; and
   (ii.2) a compound having at least two carboxyl groups reactive towards ester formation.

8. The thermosetting resin composition according to claim 1, wherein the at least one crystalline polyesterol of the mixture according to (ii) is a polyesterol based on a C2 to C10 dicarboxylic acid selected from the group consisting of adipic acid, azelaic acid sebacic acid, 12-dodecanedioic acid and mixtures of two or more of these dicarboxylic acids and a diol which is hexane-1,6-diol, neopentylglycol or a mixture of hexane-1,6-diol and neopentylglycol; or
   wherein the at least one crystalline polyesterol of the mixture according to (ii) is a saturated polyesterol based on at least an alpha-omega-hydroxy-carboxylic acid, a cyclic oligomer of an alpha-omega-hydroxy-carboxylic acid or a mixture of two or more thereof.

9. The thermosetting resin composition according to claim 1, obtained from the reaction of at least:
   i) a polycarbodiimide, wherein the number of carbodiimide groups per molecule is in the range of from 2 to 10; and
   ii) a mixture of crystalline and amorphous polyols,
   wherein the molar ratio of carbodiimide groups in the polycarbodiimide according to (i) to hydroxyl groups in the mixture according to (ii) is in the range of from 1:2 to 2:1, and wherein at least 25 weight-% of the mixture according to (ii) consists of at least one crystalline polyesterol, based on the overall weight of the mixture being 100 weight-%;
   optionally in the presence of a catalyst (iii);
   wherein the polycarbodiimide according to (i) is a toluene diisocyanate-based polycarbodiimide obtained from the reaction of at least:
      i.1) a polyisocyanate composition comprising at least TDI; and
      i.2) a monofunctional compound which is 2-ethyl hexan-1-ol;
   in the presence of a carbodiimidization catalyst (i.3); and
   wherein the at least one crystalline polyesterol of the mixture according to (ii) is a crystalline saturated copolyester based on hexane-1,6-dicarboxylic acid and hexane-1,6-diol.

10. An adhesive comprising the thermosetting resin composition according to claim 1.

11. A process for preparation of an adhesive, comprising
   a) mixing at least:
      i) a polycarbodiimide, wherein the number of carbodiimide groups per molecule is in the range of from 2 to 10;
      ii) a mixture of crystalline and amorphous polyols; and
      iii) a catalyst;
      wherein the molar ratio of carbodiimide groups in the polycarbodiimide according to (i) to hydroxyl groups in the polyesterol according to (ii) is in the range of from 1:2 to 2:1, and wherein at least 25 weight-% of the mixture according to (ii) consists of at least one crystalline polyesterol, based on the overall weight of the mixture being 100 weight-%;

wherein the mixing according to (a) is done at a temperature above the melting temperature Tm of the at least one polyesterol of the mixture according to (ii), thereby obtaining a mixture;

b) applying the mixture obtained from (a) to at least one substrate, wherein the substrate has a temperature above 0° C., wherein applying is done at a temperature of the mixture above the melting temperature Tm of the at least one crystalline polyesterol of the mixture according to (ii); and c) optionally curing the mixture on the at least one substrate at a temperature above the melting temperature Tm of the at least one crystalline polyesterol of the mixture according to (ii);

thereby obtaining an element comprising an adhesive layer on at least one substrate.

12. The process according to claim 11, wherein the at least one substrate comprises a first and a second substrate, wherein (b) comprises:

b.1) applying the mixture obtained from (a) at least partially on at least one surface of the first substrate, wherein the substrate has a temperature above 0° C., wherein applying is done at a temperature of the mixture above the melting temperature Tm of the at least one crystalline polyesterol of the mixture according to (ii), thereby obtaining a first substrate having a surface at least partially coated with the mixture obtained from (a); and b.2) positioning the second substrate at least partially onto the coated surface of the first substrate, thereby obtaining an element comprising the first and second substrate and the mixture obtained from (a) between them;

and (c) comprises curing the mixture between first and second substrate at a temperature above the melting temperature Tm of the at least one crystalline polyesterol of the mixture according to (ii), thereby obtaining an element comprising first and second substrates and an adhesive layer between them.

13. A process for preparation of an adhesive, comprising a) mixing at least:

i) a polycarbodiimide, wherein the number of carbodiimide groups per molecule is in the range of from 2 to 10;

ii) a mixture of crystalline and amorphous polyols; and iii) a catalyst;

wherein the molar ratio of carbodiimide groups in the polycarbodiimide according to (i) to hydroxyl groups in the mixture according to (ii) is in the range of from 1:2 to 2:1; and wherein at least 25 weight-% of the mixture according to (ii) consists of at least one crystalline polyesterol, based on the overall weight of the mixture being 100 weight-%; wherein the mixing according to (a) is done at a temperature above the melting temperature Tm of the crystalline polyesterol of the mixture according to (ii), thereby obtaining a mixture;

b') casting the mixture obtained according to (a) on a surface of at least one substrate having a temperature in the range of from 0 to 150° C., thereby obtaining an adhesive film on the surface; and c') optionally removing the adhesive film obtained according to (b') from the surface.

14. An element comprising an adhesive layer on at least one substrate, obtained from the process of claim 11.

15. An adhesive film, obtained from the process according to claim 13.

16. The thermosetting resin composition according to claim 1, wherein the at least one crystalline polyesterol of the mixture according to (ii) is a saturated polyesterol based on at least:

(ii.1) a compound having at least two hydroxyl groups reactive towards ester formation; and (ii.2) a compound having at least two carboxyl groups reactive towards ester formation; wherein:

the compound (ii.1) having at least two hydroxyl groups reactive towards ester formation is a saturated diol selected from the group consisting of 1,2-ethane diol, diethylene glycol, 1,2-propane diol, dipropylene glycol, 1,4-butane diol, 1,5-pentane diol, 1,6-hexane diol, neopentylglycol, and mixtures of two or more of these diols; and the compound (ii.2) having at least two carboxyl groups reactive towards ester formation is selected from the group consisting of saturated dicarboxylic acid, anhydride of a saturated dicarboxylic acid, ester of a saturated dicarboxylic acid, and mixtures of two or more of these components.

17. An element comprising an adhesive layer on at least one substrate, obtained from the process of claim 13.

18. The thermosetting resin composition according to claim 2, wherein the polycarbodiimide according to (i) is obtained by a) mixing the polyisocyanate composition according to (i.1) with at least a part of the monofunctional compound according to (i.2) at a temperature $T_1$ thereby obtaining a first mixture;

b) adding the catalyst (i.3) to the first mixture obtained in (a) at a temperature $T_2$ wherein $T_2$ is $>T_1$, thereby obtaining a precursor compound;

c) adjusting the precursor compound obtained in (b) to a temperature $T_3$; and d) adding the remaining part of the monofunctional compound according to (i.2) at temperature $T_3$; thereby obtaining the polycarbodiimide according to (i);

wherein:

T is a temperature in the range of from 5 to <70° C.;

$T_2$ is a temperature in the range of from ≥ 70 to 150° C.; and $T_3$ is a temperature in the range of from 5 to 100° ° C.

19. The thermosetting resin composition according to claim 1, wherein the at least one crystalline polyesterol of the mixture according to (ii) has a melting temperature in the range of from >30 to 80° C.

20. The thermosetting resin composition according to claim 1, wherein at least 75 weight-% of the mixture of crystalline and amorphous polyols consists of at least one crystalline polyesterol, based on the overall weight of the mixture being 100 weight-%.

* * * * *